(12) United States Patent
Lei et al.

(10) Patent No.: US 12,396,013 B2
(45) Date of Patent: Aug. 19, 2025

(54) MULTI-MODE CONFIGURATION FOR COVERAGE ENHANCEMENTS

(71) Applicant: QUALCOMM Incorporated, San Diego, CA (US)

(72) Inventors: Jing Lei, San Diego, CA (US); Chao Wei, Beijing (CN); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 387 days.

(21) Appl. No.: 17/911,634

(22) PCT Filed: Mar. 27, 2020

(86) PCT No.: PCT/CN2020/081567
§ 371 (c)(1),
(2) Date: Sep. 14, 2022

(87) PCT Pub. No.: WO2021/189398
PCT Pub. Date: Sep. 30, 2021

(65) Prior Publication Data
US 2023/0112099 A1    Apr. 13, 2023

(51) Int. Cl.
*H04W 72/51*    (2023.01)
*H04L 1/00*    (2006.01)
(Continued)

(52) U.S. Cl.
CPC ............. *H04W 72/51* (2023.01); *H04L 1/001* (2013.01); *H04L 1/0011* (2013.01);
(Continued)

(58) Field of Classification Search
CPC ........ H04W 72/51; H04W 4/70; H04L 1/001; H04L 1/0011; H04L 1/1816; H04L 1/0072; H04L 1/189; H04L 1/08; H04L 1/1819
See application file for complete search history.

(56) References Cited

U.S. PATENT DOCUMENTS

2014/0044056 A1* 2/2014 Chen ..................... H04L 5/0053
370/329
2015/0016312 A1* 1/2015 Li ............................. H04L 5/14
370/280
(Continued)

FOREIGN PATENT DOCUMENTS

CN    104780549 A    7/2015
CN    105659687 A    6/2016
(Continued)

OTHER PUBLICATIONS

International Search Report and Written Opinion—PCT/CN2020/081567—ISA/EPO—Dec. 31, 2020.
(Continued)

*Primary Examiner* — Brian J. Gillis
*Assistant Examiner* — Chhian (Amy) Ling
(74) *Attorney, Agent, or Firm* — Kevin M. Donnelly; Loza & Loza LLP

(57) ABSTRACT

Aspects of the disclosure relate to maintaining, defining, configuring and implementing a coverage enhancement mode defined for radio access network. A base station may maintain parameters that define multiple coverage enhancement modes in a lookup table and may select a first coverage enhancement mode from the two or more coverage enhancement modes for use with a first user equipment to accommodate use of one or more carrier frequencies, time or frequency duplexing mode, cell size, capabilities of the first user equipment or a channel measurements report of the first
(Continued)

user equipment, and schedule a set of control and data channels to be used for communicating with the first user equipment using a first transmission scheme defined by first parameters associated with the first coverage enhancement mode. The set of control and data channels may include uplink control and data channels and downlink control and data channels.

34 Claims, 9 Drawing Sheets

(51) Int. Cl.
  *H04L 1/08* (2006.01)
  *H04L 1/1812* (2023.01)
  *H04L 1/1867* (2023.01)
  *H04W 4/70* (2018.01)

(52) U.S. Cl.
  CPC .............. *H04L 1/0072* (2013.01); *H04L 1/08* (2013.01); *H04L 1/1816* (2013.01); *H04L 1/1819* (2013.01); *H04L 1/189* (2013.01); *H04W 4/70* (2018.02)

(56) References Cited

U.S. PATENT DOCUMENTS

| | | | | |
|---|---|---|---|---|
| 2016/0353440 | A1* | 12/2016 | Lee | H04W 4/70 |
| 2018/0183491 | A1* | 6/2018 | Takeda | H04B 1/713 |
| 2019/0021021 | A1* | 1/2019 | Thangarasa | H04W 24/10 |
| 2019/0045581 | A1* | 2/2019 | Martinez Tarradell | H04W 8/08 |
| 2019/0053042 | A1* | 2/2019 | Phuyal | H04W 8/24 |
| 2020/0022144 | A1* | 1/2020 | Papasakellariou | H04L 5/0094 |
| 2020/0187237 | A1* | 6/2020 | Su | H04L 1/1896 |
| 2020/0245180 | A1* | 7/2020 | Matsukawa | H04W 68/02 |
| 2021/0127396 | A1* | 4/2021 | Su | H04L 5/0094 |

FOREIGN PATENT DOCUMENTS

| | | |
|---|---|---|
| CN | 109565661 A | 4/2019 |
| CN | 110062474 A | 7/2019 |
| CN | 110139247 A | 8/2019 |
| CN | 110800228 A | 2/2020 |
| WO | 2015012654 A1 | 1/2015 |
| WO | 2019027262 A1 | 2/2019 |

OTHER PUBLICATIONS

Ericsson: "UE Demodulation Requirement for Rel-13 eMTC", 3GPP TSG-RAN WG4 Meeting #78, R4-160347, 3rd Generation Partnership Project (3GPP), Mobile Competence Centre, 650, Route Des Lucioles, F-06921, Sophia-Antipolis Cedex, France, vol. RAN WG4, No. St. Julian's, Malta, Feb. 15, 2016-Feb. 19, 2016, Feb. 14, 2016, pp. 1-6, XP051056758, p. 3-p. 5.

Supplementary European Search Report—EP20927009—Search Authority—The Hague—Oct. 6, 2023.

* cited by examiner

MULTI-MODE CONFIGURATION FOR COVERAGE ENHANCEMENTS

CROSS-REFERENCE TO RELATED APPLICATION(S)

This application is the U.S. national stage of PCT patent application number PCT/CN2020/081567 filed on Mar. 27, 2020.

TECHNICAL FIELD

The technology discussed below relates generally to wireless communication networks, and more particularly, to predefining, selecting and activating coverage enhancement modes.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (5G NR). 5G NR is part of a continuous mobile broadband evolution promulgated by the Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable, low-latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

Various aspects of the disclosure relate to maintaining, defining, configuring and/or operating a coverage enhancement mode selected from multiple coverage enhancement modes defined for a radio access network. As one example, a base station may maintain parameters that define multiple coverage enhancement modes in a lookup table and may select a coverage enhancement mode for use with user equipment based on channel conditions, user equipment capabilities and/or requests received from the user equipment.

In one example, a method for wireless communication at a base station in a wireless communication network is disclosed. The method can include maintaining a plurality of parameters associated with two or more coverage enhancement modes defined for a wireless communication network, selecting a first coverage enhancement mode from the two or more coverage enhancement modes for use with a first user equipment to accommodate use of one or more carrier frequencies, time or frequency duplexing mode, cell size, capabilities of the first user equipment or a channel measurements report of the first user equipment, and scheduling a set of control and data channels to be used for communicating with the first user equipment using a first transmission scheme defined by first parameters associated with the first coverage enhancement mode. The set of control and data channels may include uplink control and data channels and downlink control and data channels.

Another example provides a base station in a wireless communication network including a wireless transceiver, a memory configured to maintain a plurality of parameters associated with two or more coverage enhancement modes defined for a wireless communication network, and a processor communicatively coupled to the wireless transceiver and the memory. The processor can be configured to select a first coverage enhancement mode from the two or more coverage enhancement modes for use with a first user equipment to accommodate use of one or more carrier frequencies, time or frequency duplexing mode, cell size, capabilities of the first user equipment or a channel measurements report of the first user equipment, and schedule a set of control and data channels to be used for communicating with the first user equipment using a first transmission scheme defined by first parameters associated with the first coverage enhancement mode. The set of control and data channels may include uplink control and data channels and downlink control and data channels.

Another example provides a method for wireless communication at a user equipment in a wireless communication network. The method can include maintaining a plurality of parameters associated with two or more coverage enhancement modes defined for the wireless communication network, configuring the user equipment for a first coverage enhancement mode selected from the two or more coverage enhancement modes to accommodate use of one or more carrier frequencies, time or frequency duplexing mode, cell size, capabilities of the user equipment or a channel measurements report of the user equipment, and communicating over a wireless channel in accordance with the first coverage enhancement mode. The first coverage enhancement mode may be defined by first parameters of the plurality of parameters corresponding to the first coverage enhancement mode.

Another example provides a user equipment in a wireless communication network including a wireless transceiver, a memory, and a processor communicatively coupled to the wireless transceiver and the memory. The processor can be configured to configure the user equipment for a first coverage enhancement mode selected from the two or more coverage enhancement modes to accommodate use of one or more carrier frequencies, time or frequency duplexing mode, cell size, capabilities of the user equipment or a channel measurements report of the user equipment, and communicate over a wireless channel in accordance with the first coverage enhancement mode. The first coverage enhancement mode may be defined by first parameters of the plurality of parameters corresponding to the first coverage enhancement mode.

Various method, system, device, and apparatus embodiments may also include additional features. For example, the first coverage enhancement mode may be selected to accommodate carrier aggregation, dual connectivity, dynamic spectrum sharing or licensed-assisted access.

In certain examples, numbers of payload repetitions may be configured for communicating control and data information with the first user equipment on downlink or uplink. The numbers of payload repetitions for control and data channel communication on downlink and uplink are jointly defined by the first parameters. A lower-order modulation may be defined by the first transmission scheme when repetitions or frequency hopping is enabled for an uplink channel or for a downlink channel. The first parameters may define a maximum number of frequency hops.

In some examples, the first parameters may define a first range of coding rates for a data channel on an uplink channel or for a downlink channel. A number of payload repetitions may be configured for communicating with the first user equipment an uplink channel or for a downlink channel when the coding rate of control or data channels lies within a configured range.

In one example, the first transmission scheme is defined by the first parameters is based on binary phase-shift keying, quadrature phase-shift keying, or 16-point quadrature amplitude modulation.

In one example, the first parameters define an aggregation level for a physical downlink control channel. A number of payload repetitions may be configured for communicating with the first UE when the aggregation level is greater than 8 or when the aggregation level is greater than 16.

In one example, an uplink or downlink reference signal is configured to accommodate uplink or downlink coverage enhancement in accordance with the first parameters.

In certain examples, a second coverage enhancement mode is selected from the two or more coverage enhancement modes for communicating on uplink or downlink with a second user equipment. The second coverage enhancement mode may be selected to accommodate use of corresponding one or more carrier frequencies, time or frequency duplexing mode, cell size, capabilities of the second user equipment or a channel measurements report of the second user equipment. A greater bandwidth may be provided for scheduling the first user equipment than for scheduling the second user equipment. In some instances, the first user equipment includes a set of regular or enhanced user equipment capabilities and the second user equipment includes a set of reduced user equipment capabilities. A set of control and data channels may be scheduled for uplink or downlink communication with the second user equipment using a second transmission scheme that is different from the first transmission scheme. The first coverage enhancement mode may be defined for a downlink broadcast data channel, control channel or reference signal and the second coverage enhancement mode is defined for a downlink unicast data channel, control channel or reference signal. The first coverage enhancement mode may be defined for a stationary or low-mobility user equipment and the second coverage enhancement mode may be defined for a high-mobility user equipment. The first coverage enhancement mode may be defined for a single-hop communication link and the second coverage enhancement mode is defined for a multi-hop communication link. The first coverage enhancement mode may define a transport block size, downlink control information size or uplink control information size different from a corresponding transport block size, downlink control information size or uplink control information size defined by the second coverage enhancement mode.

In certain examples, support for at least one coverage enhancement mode of the two or more coverage enhancement modes may be indicated in physical broadcast channel or a system information block. Support for the at least one coverage enhancement mode may be indicated in a bitmap field of master information block or system information block, or a combination thereof. The parameters for uplink and downlink control, data, or reference signal communications corresponding to different coverage enhancement modes may be specified in look-up tables that are hard-coded in accordance with wireless standard. The look-up tables that maintain the parameters for uplink and downlink control, data, or reference signal communications corresponding to different coverage enhancement modes may be dynamically configured by the network or base station. Support may be indicated for the at least one coverage enhancement mode is indicated by a base station in a bitmap field of master information block, system information block, or a combination thereof.

In some examples, a user equipment specific coverage enhancement mode may be signaled in dedicated radio resource control signaling or in downlink control information. The user equipment specific coverage enhancement mode may be selected from the two or more coverage enhancement modes. The user equipment specific coverage enhancement mode may be signaled in undefined bits of the downlink control information or by mapping to a demodulation reference signal or to cyclic redundancy check bits attached to the downlink control information.

In one example, selecting the first coverage enhancement mode includes receiving a request from the first user equipment for the first coverage enhancement mode. The request for the first coverage enhancement mode may be received during initial access in a random access channel using dedicated random access channel resources.

In one example, a request for the first coverage enhancement mode is transmitted by the first user equipment. The request for the first coverage enhancement mode may be received after a radio resource control (connection has been established with the wireless communication network. The first coverage enhancement mode may be requested in an explicit scheduling request or the capability report.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
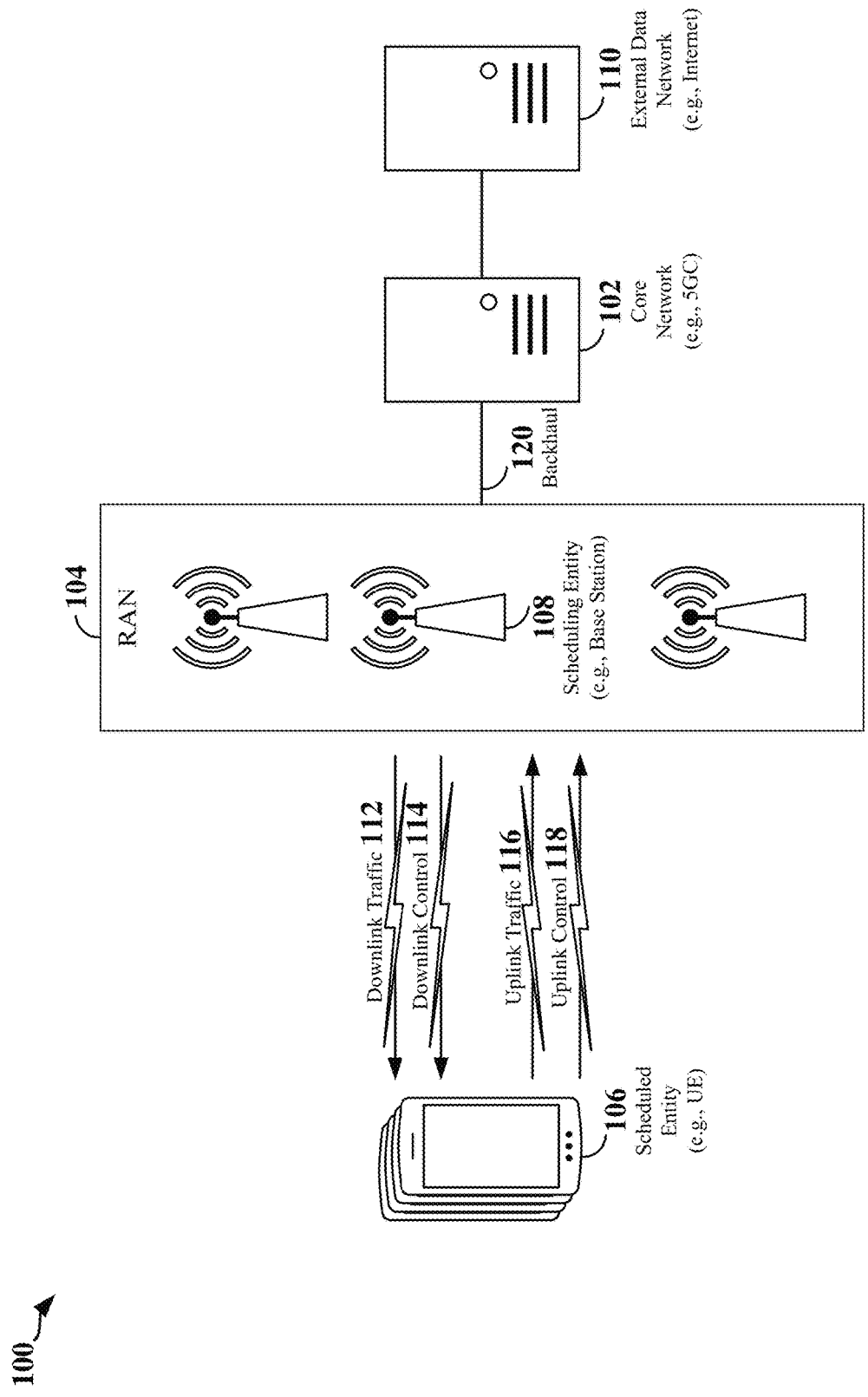
FIG. 1 is a schematic illustration of a wireless communication system according to some aspects.

The various concepts presented throughout this disclosure may be implemented across a broad variety of telecommunication systems, network architectures and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). And as discussed more below, UEs may communicate directly with other UEs in peer-to-peer fashion and/or in relay configuration.

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. In OFDM, to maintain orthogonality of the subcarriers or tones, the sub-carrier spacing (SCS) may be equal to the inverse of the symbol period. A numerology of an OFDM waveform refers to its particular subcarrier spacing and cyclic prefix (CP) overhead. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

One or more of the base stations 108 may be configured to define a BWP within an operating bandwidth provided by the wireless communication system, may be further configured to define the structure and quantity of sub-BWPs within the BWP, such that the sub-BWPs can be used for scheduling frequency-hopping transmissions. As one example, a base station 108 may schedule frequency-hopping transmissions using two or more sub-BWPs with an intervening scheduling gap that provides time for a receiver in the UE 106 to retune radio frequency front-end components, such as an antenna, a filter, or an amplifier, which may be a low noise amplifier (LNA).

Figure 2:
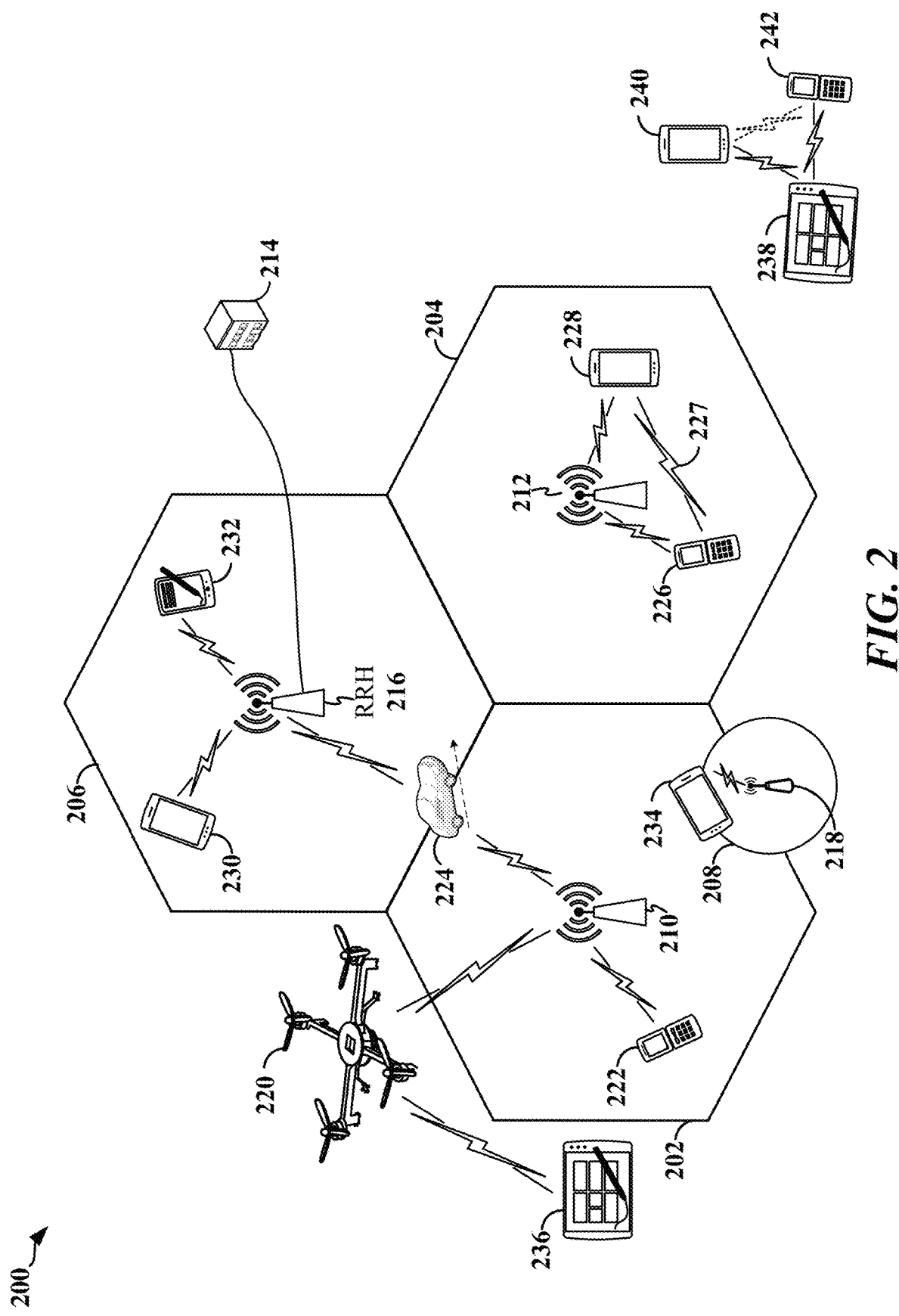
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204 and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204 and 126 may be referred to as macrocells, as the base stations 210, 212 and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214 and/or 218 may be the same as the base station/scheduling entity 108 described above and illustrated in FIG. 1.

Within the RAN 200, the cells may include UEs that may be in communication with one or more sectors of each cell. Further, each base station 210, 212, 214 and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 238, 240 and/or 242 may be the same as the UE/scheduled entity 106 described above and illustrated in FIG. 1.

In some examples, an unmanned aerial vehicle (UAV) 220, which may be a drone or quadcopter, can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may each function as a scheduled entity or a non-primary (e.g., secondary) sidelink device. In still another example, a UE may function as a scheduling entity or scheduled entity in a device-to-device (D2D), peer-to-peer (P2P), vehicle-to-vehicle (V2V) network, vehicle-to-everything (V2X) and/or in a mesh network. In a mesh network example, UEs 240 and 242 may optionally communicate directly with one another in addition to communicating with the scheduling entity. Thus, in a wireless communication system with scheduled access to time-frequency resources and having a cellular configuration, a P2P configuration, or a mesh configuration, a scheduling entity and one or more scheduled entities may communicate utilizing the scheduled resources. In some examples, the sidelink signals 227 include sidelink traffic and sidelink control. Sidelink control information may in some examples include a request signal, such as a request-to-send (RTS), a source transmit signal (STS), and/or a direction selection signal. The request signal may provide for a scheduled entity to request a duration of time to keep a sidelink channel available for a sidelink signal. Sidelink control information may further include a response signal, such as a clear-to-send (CTS) and/or a destination receive signal (DRS). The response signal may provide for the scheduled entity to indicate the availability of the sidelink channel, e.g., for a requested duration of time. An exchange of request and response signals (e.g., handshake) may enable different scheduled entities performing sidelink communications to negotiate the availability of the sidelink channel prior to communication of the sidelink traffic information.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

A radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access. Wireless devices may implement various wireless technologies where multiple radios may operate concurrently in the same or close radio frequency (RF) bands. For example, Licensed-Assisted Access (LAA) technology may utilize carrier aggregation in the downlink to combine 5G transmissions in unlicensed or shared spectrum along with LTE in the licensed spectrum.

In order for transmissions over the radio access network 200 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In certain 5G NR specifications, user data traffic is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of scheduling entities 108 and scheduled entities 106 may include suitable hardware and capabilities (e.g., an encoder, a decoder, and/or a CODEC) to utilize one or more of these channel codes for wireless communication.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing OFDM with a cyclic prefix. In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at certain times the channel is dedicated for transmissions in one direction, while at other times the channel is dedicated for transmissions in the other direction, where the direction may change very rapidly, e.g., several times per slot.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
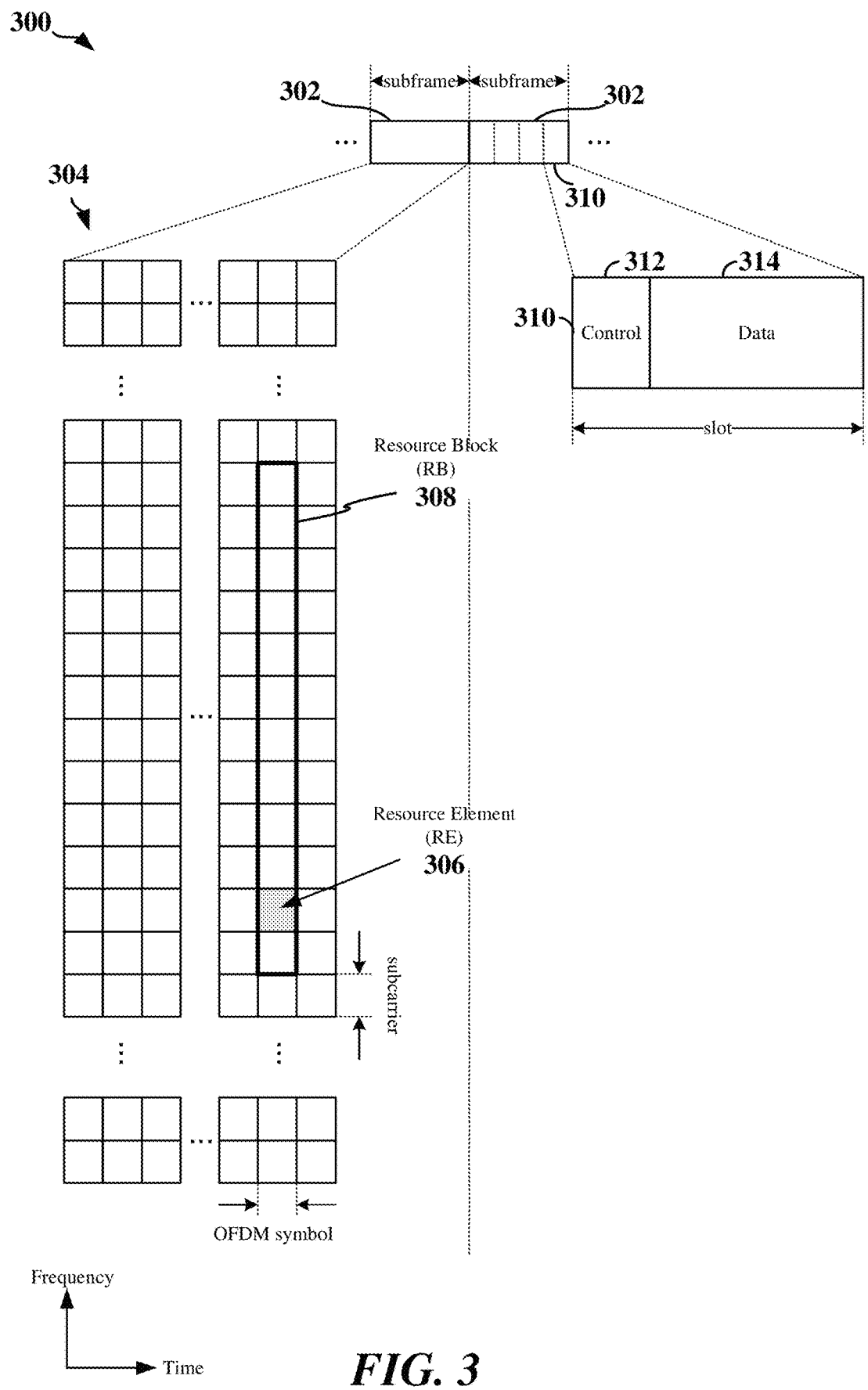
FIG. 3 is a diagram illustrating an example of a frame structure for use in a radio access network according to some aspects.

Referring now to FIG. 3, an expanded view 300 of an exemplary DL subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 308 entirely corresponds to a single direction of communication (either transmission or reception for a given device).

Scheduling of UEs (e.g., scheduled entities) for downlink or uplink transmissions typically involves scheduling one or more resource elements 306 within one or more sub-bands. Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within an RB 308 may be scheduled to carry one or more physical channels, including control channels, shared channels, data channels, etc. Other REs 306 within the RB 308 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In a DL transmission, the transmitting device (e.g., the scheduling entity 108) may allocate one or more REs 306 (e.g., within a control region 312) to carry DL control information including one or more DL control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities. The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device (e.g., the scheduled entity 106) may utilize one or more REs 306 to carry UL control information including one or more UL control channels to the scheduling entity, where the UL control channels may include a physical uplink control channel (PUCCH) and/or a Random Access Channel (RACH) such as the uplink physical random access channel (PRACH). The RACH may be used, for example, in a random access procedure during initial access of the uplink UL control information may include a variety of packet types and categories, including pilots, reference signals, and information configured to enable or assist in decoding uplink data transmissions. In some examples, the control information may include a scheduling request (SR), i.e., request for the scheduling entity to schedule uplink transmissions. Here, in response to the SR transmitted on the control channel, the scheduling entity may transmit downlink control information that may schedule resources for uplink packet transmissions. UL control information may also include HARQ feedback, channel state feedback (CSF), or any other suitable UL control information.

In addition to control information, one or more REs 306 (e.g., within the data region 314) may be allocated for user data traffic. Such traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry system information blocks (SIBs), carrying information that may enable access to a given cell. Different types of PDSCH are defined by the 3GPP, where the type may define certain characteristics including location of a DMRS symbol, location of starting symbols for PDSCH, permissible length of PDSCH. For example, PDSCH mapping Type A provides that the DMRS symbol is the third or fourth symbol, whereas DMRS symbol is the first symbol of the PDSCH in PDSCH mapping Type B.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above in connection with FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 4:
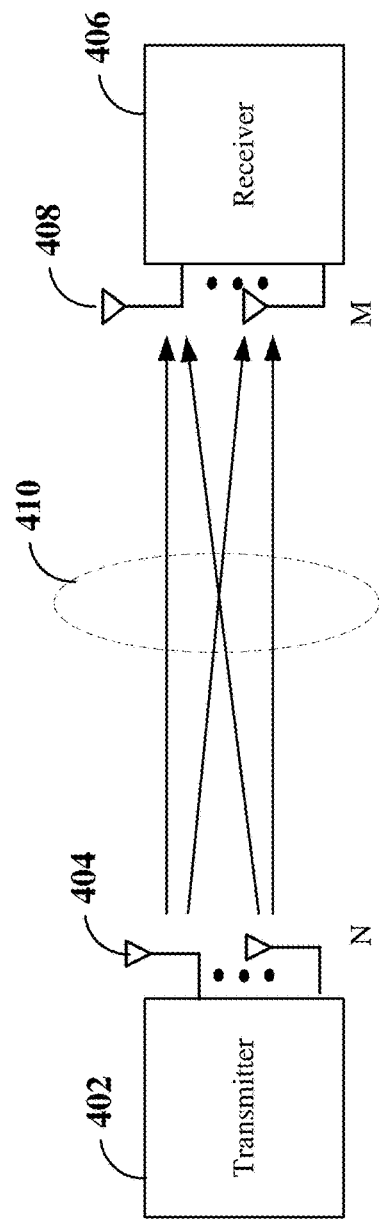
FIG. 4 is a block diagram illustrating a wireless communication system supporting beamforming and/or multiple-input multiple-output (MIMO) communication according to some aspects.

In some aspects of the disclosure, the scheduling entity and/or scheduled entity may be configured for beamforming and/or multiple-input multiple-output (MIMO) technology. FIG. 4 illustrates an example of a wireless communication system 400 supporting beamforming and/or MIMO. In a MIMO system, a transmitter 402 includes multiple transmit antennas 404 (e.g., N transmit antennas) and a receiver 406 includes multiple receive antennas 408 (e.g., M receive antennas). Thus, there are N×M signal paths 410 from the transmit antennas 404 to the receive antennas 408. Each of the transmitter 402 and the receiver 406 may be implemented, for example, within a scheduling entity, a scheduled entity, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system is limited by the number of transmit or receive antennas 404 or 408, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In one example, as shown in FIG. 4, a rank-2 spatial multiplexing transmission on a 2×2 MIMO antenna configuration will transmit one data stream from each transmit antenna 404. Each data stream reaches each receive antenna 408 along a different signal path 410. The receiver 406 may then reconstruct the data streams using the received signals from each receive antenna 408.

A processor in the transmitter 402 may map codewords to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may be split into parallel streams. Each stream may be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Each spatial stream may be provided to a different antenna 404.

In some examples, spatial multiplexing may be implemented using a coordinated multipoint (CoMP) network configuration in which transmissions from multiple transmission points (TRPs) may be simultaneously directed towards a single UE. In a multi-TRP transmission scheme, multiple TRPs may or may not be co-located and may or may not be within a same cell. Each of the multiple TRPs may transmit the same or different data to a user equipment (UE). When transmitting different data from the multiple TRPs, a higher throughput may be achieved. When transmitting the same data (with potentially different redundancy versions) from the multiple TRPs, transmission reliability may be improved. In some examples, each TRP may utilize the same carrier frequency to communicate with a UE. In other examples, each TRP may utilize a different carrier frequency (referred to as a component carrier) and carrier aggregation (CA) may be performed at the UE. In this example, the multi-TRP transmission scheme may be referred to as a multi-carrier or multi-cell transmission scheme.

The quantity of information that can be transmitted in PDCCH is dependent, in part, on the aggregation level (AL) that controls decoding of the PDCCH received from a wireless channel. In certain implementations, one of a number of ALs defined for the network is used to select a DCI format that can be mapped to DL control symbols. A higher AL improves the likelihood that UE can successfully decode the DCI through the use of a larger number of subcarriers per UE DCI, thereby reducing the number of UE DCIs that can be transmitted and/or reduce the number of OFDM symbols available for PDSCH. A higher PDSCH coding rate may be used when fewer OFDM symbols are available for PDSCH.

Beamforming is a signal processing technique that may be used at the transmitter 402 or receiver 406 to shape or steer an antenna beam (e.g., a transmit beam or receive beam) along a spatial path between the transmitter 402 and the receiver 406. Beamforming may be achieved by combining the signals communicated via antennas 404 or 408 (e.g., antenna elements of an antenna array module) such that some of the signals experience constructive interference while others experience destructive interference. To create the desired constructive/destructive interference, the transmitter 402 or receiver 406 may apply amplitude and/or phase offsets to signals transmitted or received from each of the antennas 404 or 408 associated with the transmitter 402 or receiver 406.

A base station (e.g., gNB) may generally be capable of communicating with UEs using beams of varying beam widths. For example, a base station may be configured to utilize a wider beam when communicating with a UE that is in motion and a narrower beam when communicating with a UE that is stationary. In some examples, to select a particular beam for communication with a UE, the base station may transmit a reference signal, such as a synchronization signal block (SSB) or channel state information reference signal (CSI-RS), on each of a plurality of beams in a beam-sweeping manner. The UE may measure the reference signal received power (RSRP) on each of the beams and transmit a beam measurement report to the base station indicating the RSRP of each of the measured beams. The base station may then select the particular beam for communication with the UE based on the beam measurement report. In other examples, when the channel is reciprocal, the base station may derive the particular beam to communicate with the UE based on uplink measurements of one or more uplink reference signals, such as a sounding reference signal (SRS).

5G NR networks may provide various services associated with eMBB that can satisfy advanced and diverse system requirements, and that can support communication with premium UEs, including UEs configured for eMBB, URLLC, V2X, etc. In many use cases or applications of 5G NR, peak capabilities are not required and/or UEs need not be as capable as premium UEs. 5G NR can be scaled to enable efficient and cost-effective deployment in applications where peak throughput, latency, reliability, and/or other requirements can be relaxed. In some instances, a scalable 5G NR implementation can optimize cost and efficiency in terms of power consumption and system overhead, for example.

5G NR networks may implement a set of features, which may be referred to as NR-Light, that supports reduced complexity and/or reduced capability (RedCap) UEs. In some examples, reduced complexity UEs may include wearable devices, industrial sensors, video surveillance devices (e.g., stationary cameras), and/or other suitable devices. As compared to standard UEs (e.g., smartphones), reduced complexity UEs may have a lower wireless transmission power, fewer antennas (e.g., antennas for transmitting and/or receiving), a reduced bandwidth for wireless transmission and/or reception, reduced computational complexity/memory, and/or longer battery life.

A UE may support a reduced maximum bandwidth (BW). Certain conventional 5G NR protocols or standards may require the UE to support a maximum channel BW defined for the bands in which it operates. In one example the UE may be required to support a 50 MHz for 15 kHz SCS and 100 MHz for 30/60 kHz SCS (for Band n78, which may be 3300 MHz-3800 MHz). A 5G NR-Light UE may support a bandwidth in the range of 5.0 MHz to 20 MHz.

In various implementations, a 5G NR-Light UE may be equipped with a single antenna for receiving signals. The limitation to a single receiving antenna reduces diversity in DL signaling. Diversity can improve reliability of the system when, for example, data-encoded signals propagate over multiple paths. DL spatial diversity can be obtained when multiple receive antennas are used to receive DL signals from multiple different propagation paths.

Certain aspects of this disclosure provide multiple modes of Coverage Enhancement (CE) that can be provided for UEs that are deployed at different frequency bands and equipped with different capabilities. Certain UEs may experience poor channel conditions for a variety of reasons, including interference, features of the physical geography between a base station and the UEs, other barriers such as walls, buildings etc. and/or motion of the UE. CE techniques, which can include prolonging transmission time, may be employed to improve wireless coverage to these and other UEs. Prolonged transmission time may be used for coverage enhancement on both UL and DL. Transmission time may be prolonged by using lower-order modulation schemes, lower coding rate for the data channel, higher ALs for PDCCH and/or transport blocks or payload repetitions.

Selection of the number of repetitions for DL and UL physical control channels and/or data channels may be based on a tradeoff between coverage efficiency and resource allocation efficiency. For example, some conventional systems provide multiple MCS tables with multiple entries to be used for communication between a base station and UEs. In one example, five MCS tables may be available to the base station, with each MCS table including 32 or more entries. However, some combinations of modulation, coding rate (or AL for PDCCH) and/or the number of repetitions provide a poor tradeoff between CE and resource allocation efficiency. Certain aspects of the disclosure identify multiple combinations of the number of repetitions, modulation and coding rate or AL that can be used for multiple modes of CE. Systematic selection between preconfigured, agreed or standardized CE modes enables the base station to efficiently configure a UE for CE. The availability of preconfigured, agreed or standardized CE modes can enable the UE to select and request a preferred or desired CE mode.

Certain aspects of this disclosure provide various design options for CE in a 5G NR network by defining and/or supporting multiple modes of coverage enhancement. Each CE mode can be configured with a distinctive set of parameters and/or definitions for physical channels, reference signals and/or procedures. Certain CE modes may be defined to address propagation losses that can be associated with channel characteristics. CE mode configuration parameters may be defined to accommodate restricted configurations for modulation, coding rate or AL, and repetition levels.

Figure 5:
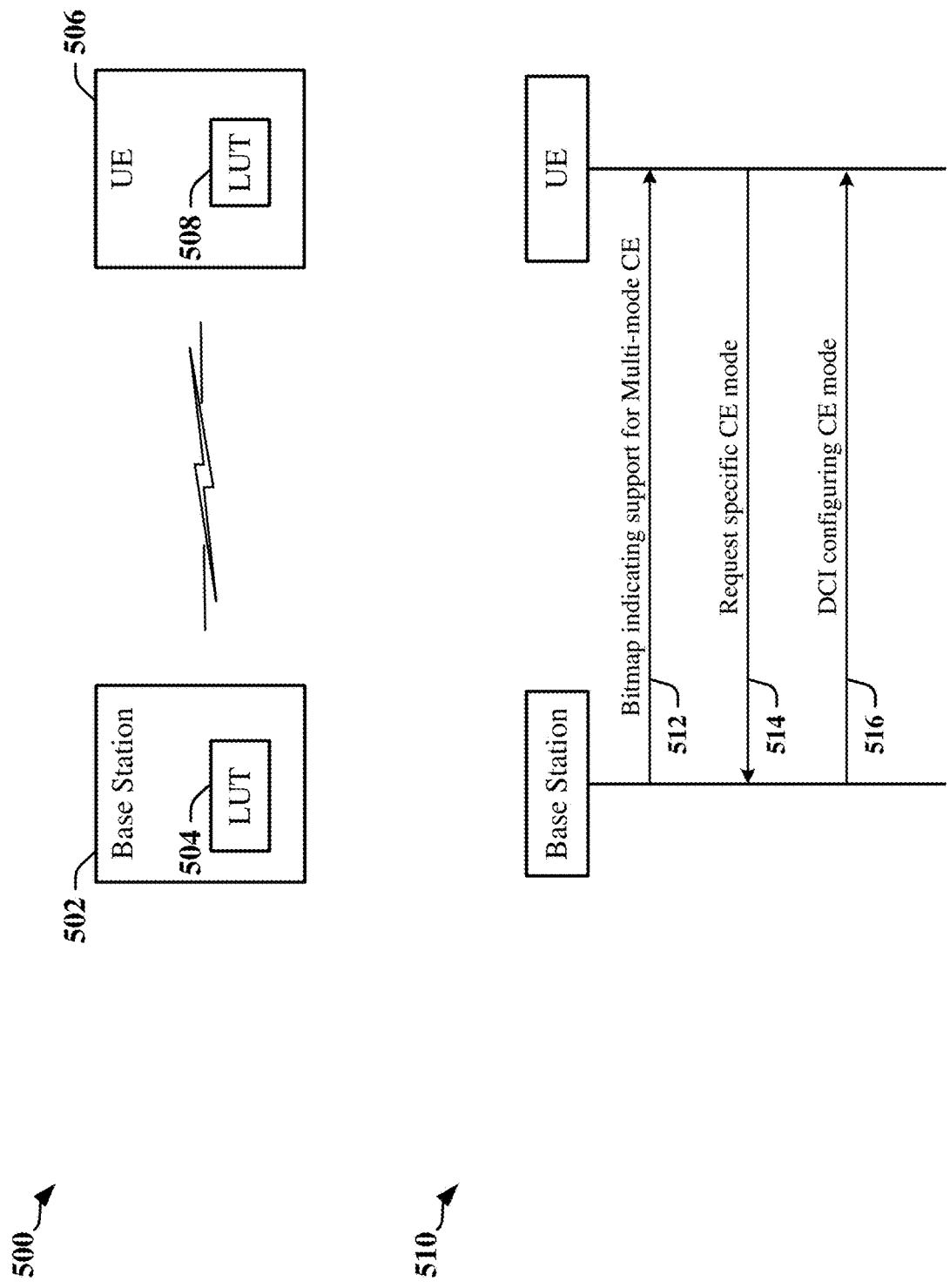
FIG. 5 is a message flow diagram that illustrates an example of messaging used to implement multi-mode coverage enhancement in accordance with various aspects of the disclosure.

In accordance with one or more aspects of this disclosure, UEs and base stations may be configured to maintain information describing multiple modes of CE specified for use in the 5G NR network. FIG. 5 illustrates an example 500 in which a base station 502 (e.g., gNB) includes a lookup table (LUT 504) that can be used to maintain parameters for multiple CE modes. In one example, the CE modes represented in the LUT 504 may be predesigned or predefined by a system designer such that each CE mode represented in the LUT 504 provides a good or reasonable tradeoff between CE and resource allocation efficiency. In some instances, the LUT 504 may be updated by the network during system operation.

The parameters stored in the LUT 504 may be used to configure a UE 506 for the selected CE mode. In one example, the base station 502 may configure the UE 506 in accordance with parameters defined for the selected CE mode. In another example, the base station 502 may indicate a table entry to the UE 506 when the UE 506 maintains a local LUT 508, and the UE 506 may index the local LUT 508 to obtain configuration parameters for an indicated CE mode.

A CE mode may be selected based on channel conditions, location and type of a UE 506 with respect to a base station 502 and for other conditions affecting the 5G NR network. In one example, CE modes may be specified to support operation on different frequency bands within a cell, including licensed, unlicensed and shared spectrum, which may be deployed at low or high frequency bands. In another example, CE modes may be specified to support operation CA, dual connectivity (DC), dynamic spectrum sharing (DSS), LAA deployments including, for example, fallback CC selection and CE mode configurations.

In another example, CE modes may be specified to support different capabilities of UEs that are operated within the cell, including RedCap and premium UEs. RedCap and premium UEs can use different CE modes depending on available bandwidth, antenna configuration device complexity and/or cost. In some instances, CE modes specified for use with one type of equipment may be used by another type of equipment. For example, a premium UE can request a CE mode for reduced capabilities operation in order to accrue the benefits of power saving.

In another example, CE modes may be specified to support different applications and/or use cases. Certain CE modes for use within a cell may be specified for broadcast or unicast traffic, stationary or high-mobility UEs, single-hop or multi-hop (sidelink or relay) connections. Some CE modes may be specified for different cell sizes.

In some instances, multiple CE modes may coexist within a network, cell, and/or base station 502. A base station 502 can be configured to support multiple CE modes, a single CE mode or no CE mode. The base station 502 may indicate support for one or more CEs in PDCCH.

According to one aspect, multiple CE modes may be defined for use of the base station 502 when communicating with a UE 506. Each CE mode may define parameters including modulation, coding rate, AL for PDCCH transmissions, and repetition levels. The base station 502 may select one of the predefined CE modes based on factors that include channel conditions, UE capability and/or requirements of applications or specific use cases.

In certain aspects of this disclosure, CE Mode may be defined or distinguished by one or more configuration parameters. Each CE mode can be configured with a distinctive set of parameters and/or entries for physical channels, reference signals, and/or procedures including, for example, numerologies MCS (PDSCH/PUSCH), AL (PDCCH), DMRS, tracking reference signal (TRS), CSI-RS, and/or SRS enhancement. Reference signals may be enhanced when increased path loss is observed. A CE mode may be activated when path loss increases and the CE mode may include configuration parameters that provide for enhanced reference signals. For example, the TRS may be modified to ensure that a tracking loop is synchronized to ensure reliable demodulation and/or decoding.

The CE mode may configure a maximum number of repetition levels, which can be continuous or non-continuous in the time domain Non-continuous repetition may be configured in order to prevent UL repetitions from interfering with DL transmissions and UL repetitions from interfering with DL transmissions. The repetition level may be increased when to increase CE. The CE mode may configure a maximum number of frequency hops. The CE mode may configure parameters for HARQ, RACH, power control, timing control, beam management, and/or radio resource management (RRM) measurement procedures. The CE mode may configure parameters for duplexing mode, where duplexing modes may include FDD half-duplex or full-duplex, TDD, supplementary uplink (SUL) and/or supplementary downlink. The CE mode may configure parameters for timeline adaptation including, for example, relaxations on K0/K1/K2 may be necessary to deal with cross-slot scheduling, repetitions, channel estimation based on DMRS bundling.

In accordance with one aspect disclosed herein, parameters and configurations associated with each CE mode can be maintained in one or more LUTs 504, 508 maintained in the base station 502 and/or UE 506 respectively. The parameters for the CE modes maintained by the LUT 504, 508 may be defined by protocol or specification, and may be hardcoded in the base station 502 and/or the UE 506. In some implementations, configurations and parameters associated with each CE mode may be signaled by the network in state information/radio resource control (SI/RRC) signaling. For example, default configurations for each CE mode can be hardcoded in accordance with radio access technology specifications, and the network can override the default configurations using SI/RRC signaling.

According to certain aspects of this disclosure, default configurations for CE modes may be bound by rules that define restricted configurations for CE mode. The rules restricting default configurations for CE modes may provide different CE modes that can support different ranges of TBS (for PDSCH/PUSCH) or payload size for DCI and/or uplink control information (UCI). Partial overlapping of TBS or DCI/UCI payload size may be allowed across different CE modes.

The rules restricting default configurations for CE mode may prioritize lower-order modulation when repetition or frequency hopping is enabled. For example, a modulation scheme for PDSCH/PUSCH can be restricted to QPSK (or 16-QAM) when the repetition level or frequency hops are larger than a pre-determined threshold.

The rules restricting default configurations for CE mode may configure repetitions of PDCCH in CSS or USS when AL is greater than 8 or 16. Repetitions for PDSCH (unicast or broadcast) and/or PUSCH (unicast) may be configured when the coding rates are within the range of [Rmin, Rmax].

The rules restricting default configurations for CE mode may define constraints on high speed/doppler. In some instances, cell-specific CE modes may not need to address high speed UEs. Other solutions, such as macro-diversity, multi-connectivity, etc., can be exploited for CE for high-speed UEs.

According to certain aspects of this disclosure, and as illustrated by the message flow diagram 510, the base station 502 can be configured to indicate its support for single or multiple CE modes in one or more broadcast messages 512, such as PBCH, SIB. In one example, the base station 502 may use a bitmap to indicate support for single or multiple CE modes. For example, a base station may transmit a 4-bit binary bitmap value of 1000 to indicate support for CE Mode-A and a 4-bit binary bitmap of value of 1001 to indicate support for CE Mode A and CE Mode-B.

In some implementations, a UE 506 can request a specific CE mode 514. In one example, the UE may request the specific CE mode during initial access using dedicated RACH resources. In another example, the UE may request the specific CE mode after RRC connection by sending an explicit scheduling request or UE capability report. In one example, the UE may use a bitmap to request a specific CE mode. In one example, a RedCap UE that has reduced bandwidth capability for wireless transmission and/or reception may request CE Mode-A using a 4-bit binary bitmap of value of 1000 when CE Mode-A is defined for reduced bandwidth transmissions, while a premium UE may request CE Mode-B using a 4-bit binary bitmap of value of 1001 when CE Mode-B is defined for high-speed UEs. In another example, the RedCap UE may indicate a reduced bandwidth capability in the UE capability report.

The base station 502 can use DCI to signal a UE-specific configuration for DL and/or UL 516. The UE-specific configuration may define repetition/hop number corresponding to a selected or chosen CE mode by repurposing unused bits of the DCI field. For example, MCS restriction reduces the range of $I_{MCS}$, by mapping to the CRC mask of DCI, and/or mapping to the DMRS scrambling ID of PDCCH.

Figure 6:
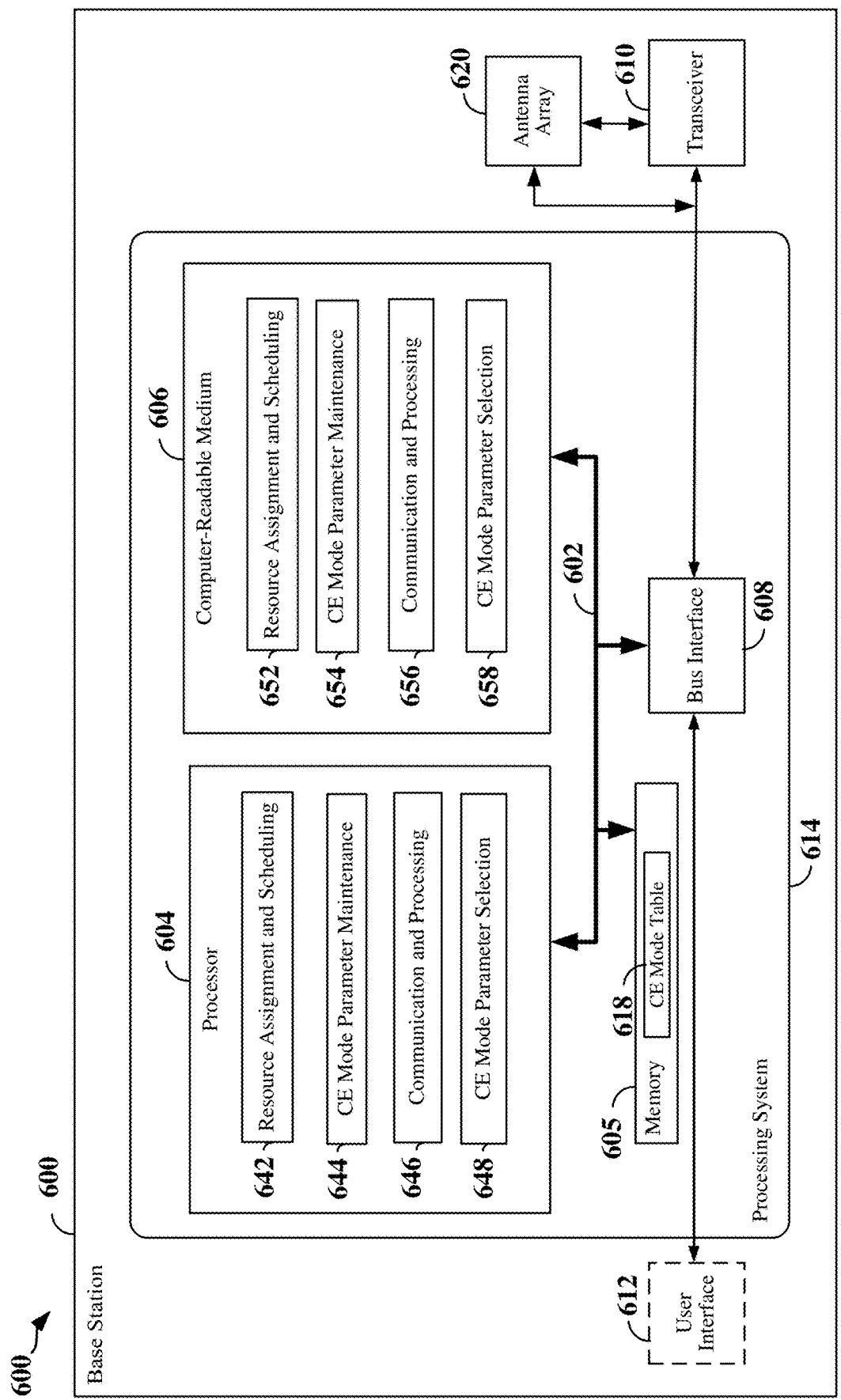
FIG. 6 is a block diagram illustrating an example of a hardware implementation for a base station employing a processing system according to some aspects.

FIG. 6 is a conceptual diagram illustrating an example of a hardware implementation for an exemplary base station 600 employing a processing system 614. For example, the base station 600 may be a base station as illustrated in any one or more of FIG. 1 or 2. The processing system 614 may include a bus interface 608, a bus 602, memory 605, a processor 604, and a computer-readable medium 606. The computer-readable medium 606 may store or maintain computer-executable code, instructions and/or software. Furthermore, the base station 600 may include an optional user interface 612 and a transceiver 610 that can provide a means for communicating with various other apparatus over a transmission medium (e.g., air interface). In addition, the base station 600 may further include one or more antenna array modules 620. In accordance with various aspects of the disclosure, an element, or any portion of an element, or any combination of elements may be implemented with the processing system 614 that includes one or more processors 604. That is, the processor 604, as utilized in a base station 600, may be used to implement any one or more of the processes described below.

In some aspects of the disclosure, the processor 604 may include circuitry configured for various functions. For example, the processor 604 may include resource assignment and scheduling circuitry 642, configured to generate, schedule, and modify a resource assignment or grant of time-frequency resources (e.g., a set of one or more resource elements). For example, the resource assignment and scheduling circuitry 642 may schedule time-frequency resources within a plurality of time division duplex (TDD) and/or frequency division duplex (FDD) subframes, slots, and/or mini-slots to carry user data traffic and/or control information to and/or from multiple UEs. In other examples, the resource assignment and scheduling circuitry 642 may be configured to schedule a communication channel for a first UE using a first transmission scheme defined by parameters associated with a first coverage enhancement mode. In some examples, the resource assignment and scheduling circuitry 642 may cooperate with CE mode parameter selection circuitry 648. The resource assignment and scheduling circuitry 642 may further be configured to execute resource assignment and scheduling modules 652 stored in the computer-readable medium 606 to implement one or more of the functions described herein.

The processor 604 may further include CE mode parameter maintenance circuitry 644 configured to maintain, update and/or configure a plurality of parameters 618 associated with two or more coverage enhancement modes defined for a wireless communication network. The CE mode parameter maintenance circuitry 644 may further be configured to execute CE mode parameter maintenance modules 654 stored on the computer-readable medium 606 to implement one or more functions described herein.

The processor 604 may further include communication and processing circuitry 646 configured to communicate with a UE. In some examples, the communication and processing circuitry 646 may include one or more hardware components that provide the physical structure that performs processes related to wireless communication (e.g., signal reception and/or signal transmission) and signal processing (e.g., processing a received signal and/or processing a signal for transmission). The communication and processing circuitry 646 may be configured to transmit a CSI-RS to the UE and receive channel state feedback (CSF) 618 from the UE in response to the CSI-RS. The CSF may include, for example, a channel quality indicator (CQI), precoding matrix indicator (PMI) and rank indicator (RI). In some examples, the communication and processing circuitry 646 may store the CSF 618 in memory 605 for further processing. In addition, the communication and processing circuitry 646 may be configured to implement a HARQ feedback mechanism to receive ACK/NACK from the UE. The communication and processing circuitry 646 may further be configured to execute communication and processing modules 656 stored on the computer-readable medium 606 to implement one or more functions described herein.

The processor 604 may further include CE mode parameter selection circuitry 648 configured to maintain a plurality of parameters 618 associated with two or more coverage enhancement modes defined for a wireless communication network, and to select the first coverage enhancement mode for use with the first UE. The CE mode parameter selection circuitry 648 may further be configured to identify a plurality of parameters 618 associated with a coverage enhancement mode selected for use with a UE in the wireless communication network. The CE mode parameter selection circuitry 648 may further be configured to execute CE mode parameter selection modules 658 stored on the computer-readable medium 606 to implement one or more functions described herein.

In certain examples, the processing system 614 of the base station 600 selects a first coverage enhancement mode for use with the first UE, schedules a communication channel for the first UE using a first transmission scheme defined by first parameters associated with the first coverage enhancement mode, and signals a UE-specific coverage enhancement mode in DCI. The processing system 614 may indicate support for at least one coverage enhancement mode in physical broadcast channel or a system information block, wherein the support for the at least one coverage enhancement mode is indicated in a bit mapped field. The processing system 614 may configure a number of payload repetitions for communicating with the first UE. The number of payload repetitions may be defined by the first parameters. The first parameters may define a maximum number of frequency hops. The first parameters may define a coding rate for a data channel. The first parameters define an aggregation level for a PDCCH.

The processing system 614 may be further configured to select a second coverage enhancement mode for use with a second UE, and provide a greater bandwidth for scheduling the first UE than for scheduling the second UE. For example, the first UE may be a premium UE and the second UE may be a reduced capacity UE. The processing system 614 may be further configured to select a second coverage enhancement mode for use with a second UE, and schedule a communication channel for the second UE using a second transmission scheme that is different from the first transmission scheme.

Figure 7:
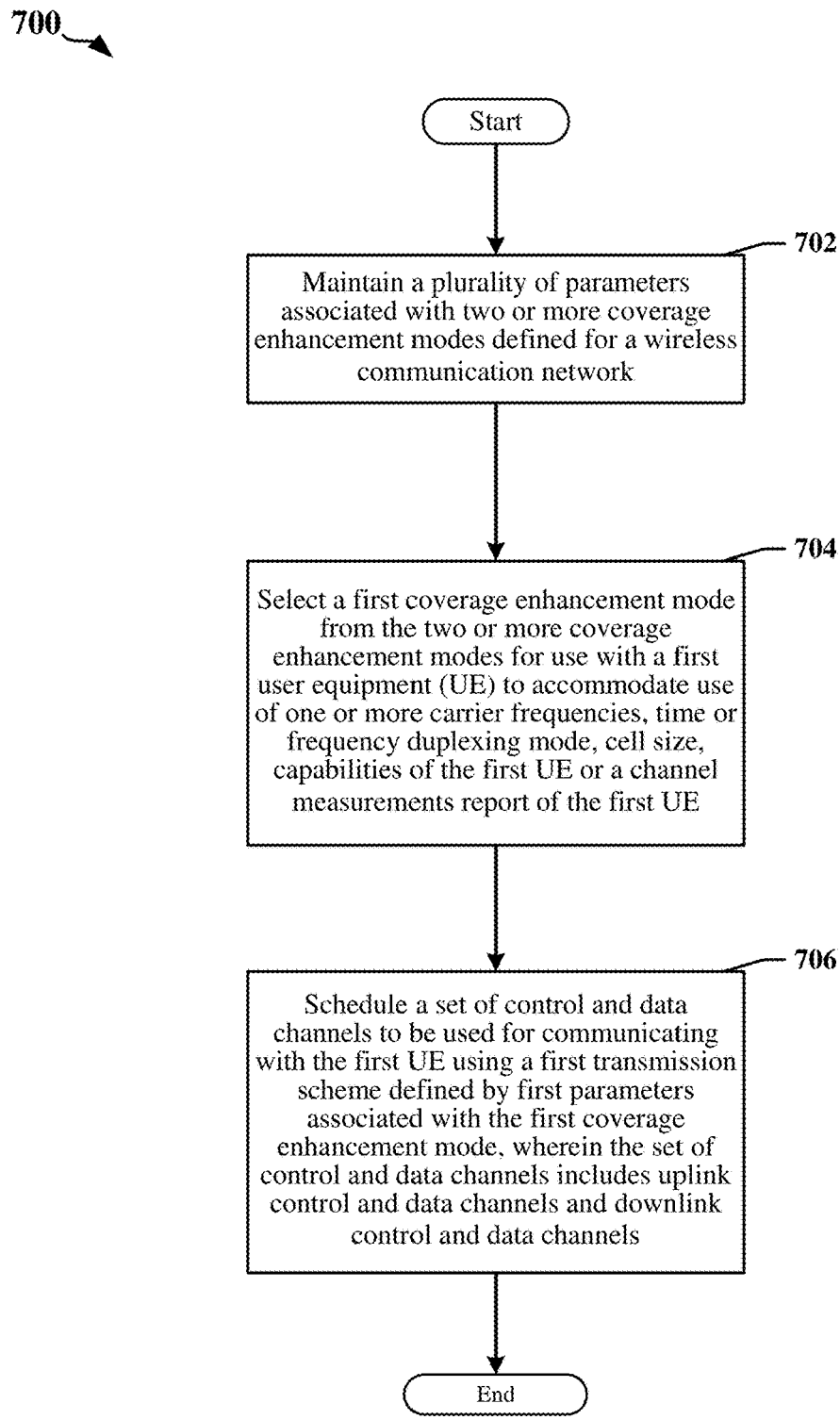
FIG. 7 is a flow chart of a method for a base station to select and configure coverage enhancement modes in accordance with certain aspects disclosed herein.

FIG. 7 is a flow chart 700 of a method for a base station in a wireless communication network to configure select and configure CE modes for one or more UEs. At block 702, the base station may maintain a plurality of parameters associated with two or more coverage enhancement modes defined for a wireless communication network. At block 704, the base station may select a first coverage enhancement mode from the two or more coverage enhancement modes for use with a first UE. The first coverage enhancement mode may be selected to accommodate use of one or more carrier frequencies, time or frequency duplexing mode, cell size, capabilities of the first UE or a channel measurements report of the first UE. According to one aspect the first coverage enhancement mode may be selected from two or more coverage enhancement modes that have been predefined, designed and/or configured by a network designer. The first coverage enhancement mode may be selected to accommodate carrier aggregation, dual connectivity, dynamic spectrum sharing and/or licensed-assisted access. At block 706, the base station may schedule a set of control and data channels to be used for communicating with the first UE using a first transmission scheme defined by first parameters associated with the first coverage enhancement mode. The set of control and data channels may include uplink control and/or data channels. The set of control and data channels may include uplink and/or downlink control and data channels. In one example, the first parameters define a maximum number of frequency hops. In another example, the first parameters may define a first range of coding rates for a data channel on an uplink channel or for a downlink channel. The base station may configure a number of payload repetitions for communicating with the first UE an uplink channel or for a downlink channel when the coding rate of control or data channels lies within a configured range. The first transmission scheme may be defined by the first parameters is based on BPSK, QPSK or 16-QAM. In some instances, different repetitions may be configured for DL and UL control and data channels, to account for asymmetry of transmit power of the base station and UE. In some instances, benefit can be accrued from balancing the coverage enhancements defined for DL and UL control and/or data communication, and joint definition for the numbers of repetitions for DL and UL may be provided or enabled.

According to certain aspects of this disclosure, the configuration and selection of coverage enhancement modes may be jointly determined based on cell-specific conditions (e.g. frequency bands, cell size, etc.) and UE conditions (e.g. UE capabilities, UE's measurement of RSRP, etc.). In some instances, the UE reports its capability or channel measurements to the base station before the base station selects a specific coverage enhancement mode for the UE. A specific coverage enhancement mode can include a group of parameters that are associated with multiple DL and UL physical channels (control or data) and reference signals. The coverage enhancement mode configuration may include a group of parameters associated with multiple reference signals, and/or control and data channels on DL and UL, such as PDCCH, PDSCH, PUSCH, PUCCH, PRACH, CSI-RS and/or SRS.

In some implementations the base station may configure numbers of payload repetitions for communicating control and/or data information with the first UE on downlink and/or uplink. The numbers of payload repetitions for control and/or data channel communication on downlink and/or uplink may be jointly defined by the first parameters. A lower-order modulation may be defined when repetitions or frequency hopping is enabled for an uplink channel or for a downlink channel.

In one example, the first parameters define an aggregation level for a PDCCH. The base station may configure a number of payload repetitions for communicating with the first UE when the aggregation level is greater than 8 or when the aggregation level is greater than 16.

The base station may configure a reference signal to accommodate channel conditions in accordance with the first parameters. The base station may select a second coverage enhancement mode for use with a second UE, and provide a greater bandwidth for scheduling the first UE than for scheduling the second UE when, for example, the first UE is a premium UE and the second UE is a reduced capacity UE.

In certain implementations the base station may select a second coverage enhancement mode from the two or more coverage enhancement modes for communicating on uplink or downlink with a second UE, the second coverage enhancement mode being selected to accommodate use of corresponding one or more carrier frequencies, time or frequency duplexing mode, cell size, capabilities of the second UE or a channel measurements report of the second UE. The base station may provide a greater bandwidth for scheduling the first UE than for scheduling the second UE. In one example, the UE may comprise a set of regular or enhanced UE capabilities and the second UE may comprise a set of reduced UE capabilities. In one example, the first coverage enhancement mode may be defined for defined for a downlink broadcast data channel, control channel or reference signal and the second coverage enhancement mode is defined for a downlink unicast data channel, control channel or reference signal. In another example, the first coverage enhancement mode may be defined for a stationary or low-mobility UE and the second coverage enhancement mode may be defined for a high-mobility UE. In another example, the first coverage enhancement mode may be defined for a single-hop communication link and the second coverage enhancement mode may be defined for a multi-hop communication link. In another example, the first coverage enhancement mode defines a transport block, downlink control information or uplink control information size different from a size of the corresponding transport block, downlink control information or uplink control information defined by the second coverage enhancement mode.

In some implementations, parameters for uplink and downlink control, data, or reference signal communications corresponding to different coverage enhancement modes are specified in look-up tables that are hard-coded in accordance with wireless standard or dynamically indicated by a base station. The base station may indicate support for the at least one coverage enhancement mode is indicated by a base station in a bitmap field of master information block (MIB) or system information block (SIB), or a combination of MIB and SIB indication. The support for the at least one coverage enhancement mode may be indicated in a bit mapped field. The base station may signal a UE-specific coverage enhancement mode in DCI. The UE-specific coverage enhancement mode may be signaled in undefined bits of the DCI or by mapping to DMRS or a CRC. The UE-specific coverage enhancement mode may be signaled in undefined bits of the DCI or by mapping to a demodulation reference signal or to cyclic redundancy check bits attached to the DCI.

In one example, selecting the first coverage enhancement mode includes receiving a request from the first UE for the first coverage enhancement mode. The request for the first coverage enhancement mode may be received during initial access in RACH, using dedicated RACH resources.

In another example, selecting the first coverage enhancement mode includes receiving a request from the first UE for the first coverage enhancement mode. The request for the first coverage enhancement mode is received after an RRC connection has been established with the wireless communication network. The first coverage enhancement mode may be requested in an explicit scheduling request or the capability report.

Figure 8:
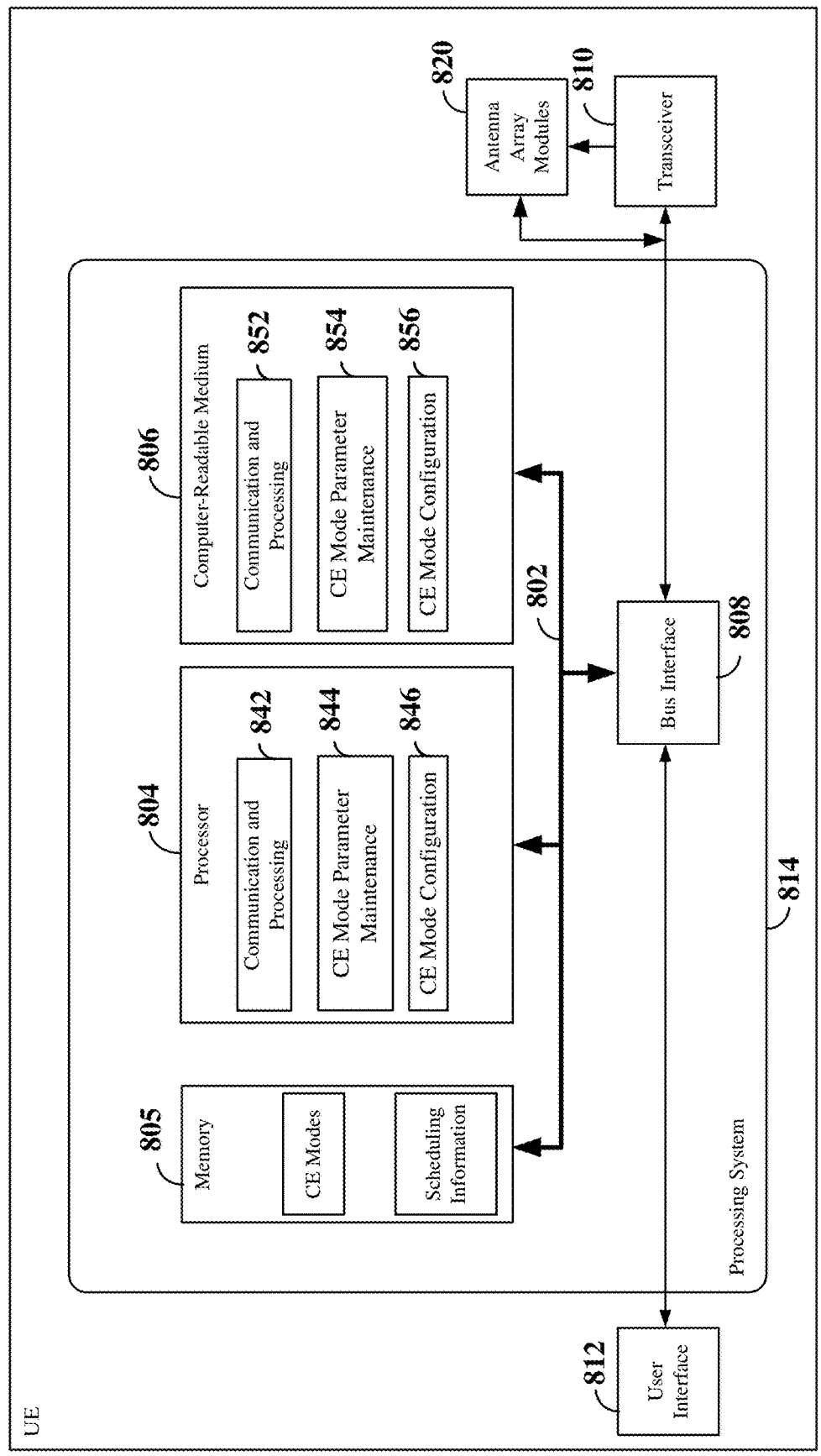
FIG. 8 is a block diagram illustrating an example of a hardware implementation for a UE employing a processing system according to some aspects.

FIG. 8 is a conceptual diagram illustrating an example of a hardware implementation for an exemplary user equipment (e.g., UE 800) employing a processing system 814. For example, the UE 800 may be a UE as illustrated in any one or more of FIGS. 1 and 2. The processing system 814 may be substantially the same as the processing system 614 illustrated in FIG. 6, including a bus interface 808, a bus 802, memory 805, a processor 804, and a computer-readable medium 806. Furthermore, the UE 800 may include a user interface 812 and a transceiver 810 substantially similar to those described above in FIG. 6. For example, the transceiver 810 may be configured to couple the UE 800 to a 5G NR wireless communication network. In addition, the UE may further include one or more antenna modules 820. An antenna module may include one or more antennas. In accordance with various aspects of the disclosure, an element, or any portion of an element, or any combination of elements may be implemented with the processing system 814 that includes one or more processors 804. That is, the processor 804, as utilized in a UE 800, may be used to implement any one or more of the processes described below.

In some aspects of the disclosure, the processor 804 may include circuitry configured for various functions. For example, the processor 804 may include communication and processing circuitry 842 configured to communicate with a base station. In some examples, the communication and processing circuitry 842 may include one or more hardware components that provide the physical structure that performs processes related to wireless communication (e.g., signal reception and/or signal transmission) and signal processing (e.g., processing a received signal and/or processing a signal for transmission). In some examples, the communication and processing circuitry 842 may be configured to generate and transmit an uplink signal at a mmWave frequency or a sub-6 GHz frequency via the transceiver 810 and antenna modules 820. In addition, the communication and processing circuitry 842 may be configured to receive and process a downlink signal at a mmWave frequency or a sub-6 GHz frequency via the antenna modules 820 and the transceiver 810.

The communication and processing circuitry 842 may further be configured to transmit and receive mmWave relay signals to and from other UEs. In some examples, the mmWave relay signals may include synchronization signals, random access messages, beam reference signals (RSs), and/or relay communications. The communication and processing circuitry 842 may further be configured to execute communication and processing modules 852 stored on the computer-readable medium 806 to implement one or more functions described herein.

The processor 804 may further include CE mode parameter maintenance circuitry 844. The CE mode parameter maintenance circuitry 844 may manage parameters that configure and control certain features and operational aspects of the transceiver 810 and/or antenna modules 820, including power amplifiers, low-noise amplifiers, switches, filters, phase management circuits, power trackers, tuners, antennas, and the like. The CE mode parameter maintenance circuitry 844 may be further configured to execute CE mode parameter maintenance modules 854 stored on the computer-readable medium 806 to implement one or more of the functions described herein.

The CE mode parameter maintenance circuitry 844 may be configured to operate in coordination with the CE mode configuration circuitry 846. For example, the CE mode configuration circuitry 846 may configure the transceiver 810 to monitor receive and transmit signals in any of a number of frequency bands, using parameters defined by a selected CE mode, including parameters that select an MCS and a maximum number of payload repetitions. The CE mode configuration circuitry 846 may configure frequency hopping configurations. The CE mode configuration circuitry 846 may further be configured to execute CE mode configuration software 856 stored on the computer-readable medium 806 to implement one or more of the functions described herein.

Figure 9:
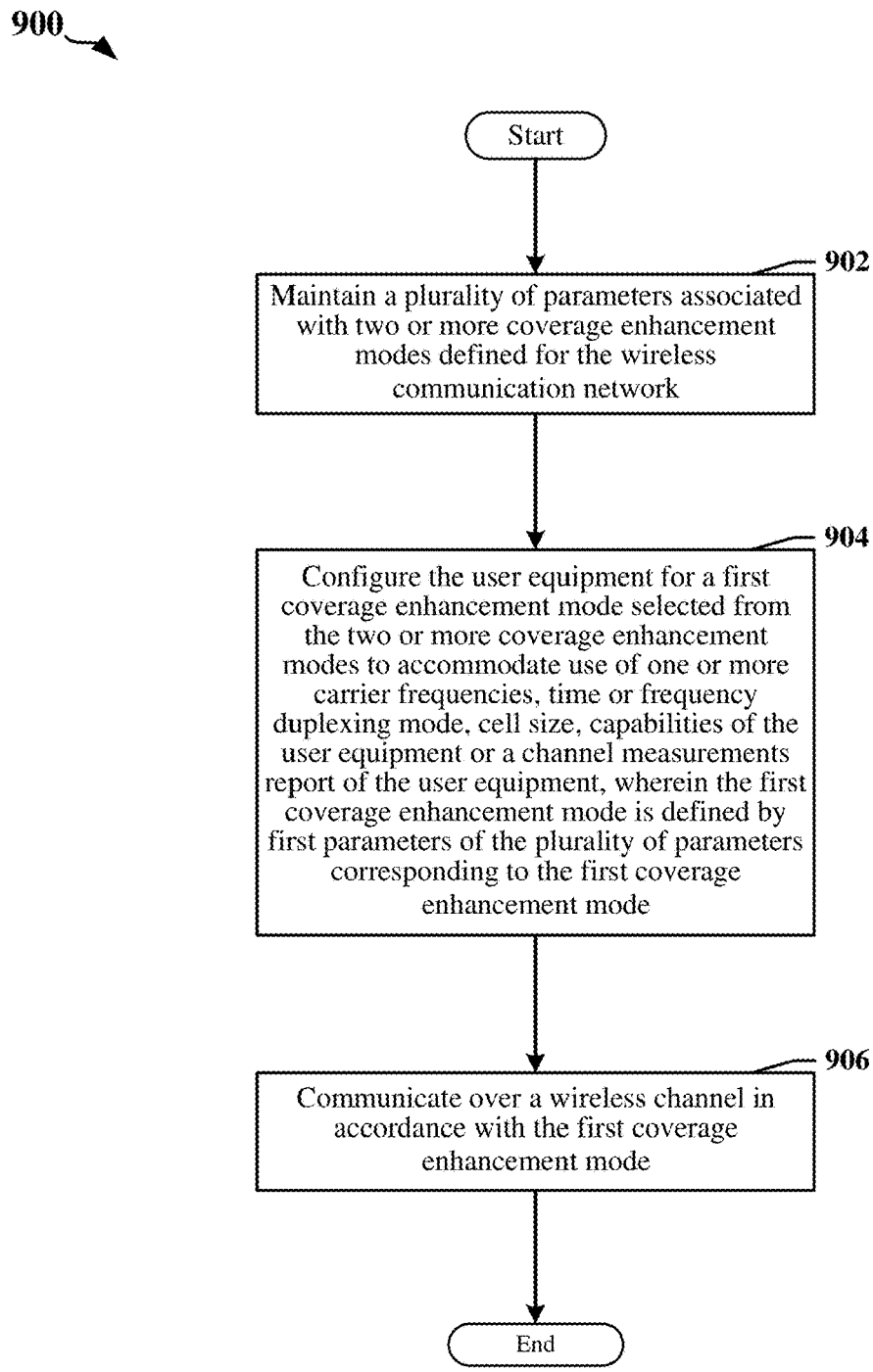
FIG. 9 is a flow chart of a method for a UE in accordance with certain aspects disclosed herein.

FIG. 9 is a flow chart 900 of a method for wireless communication at a UE in a wireless communication network. The UE may be configured to implement one or more CE modes in accordance with certain aspects disclosed herein. At block 902, the UE may configure or maintain a plurality of parameters associated with two or more coverage enhancement modes defined for the wireless communication network. At block 906, the UE may configure the user equipment for a first coverage enhancement mode selected from the two or more coverage enhancement modes to accommodate use of one or more carrier frequencies, time or frequency duplexing mode, cell size, capabilities of the user equipment or a channel measurements report of the user equipment. The first coverage enhancement mode may be defined by first parameters of the plurality of parameters corresponding to the first coverage enhancement mode. At block 906, the UE may communicate over a wireless channel in accordance with a first coverage enhancement mode selected based on channel conditions and capabilities of the user equipment. The UE may be configured to activate the first coverage enhancement mode in response to signaling received in downlink control information.

In certain implementations the UE may request the first coverage enhancement mode using an uplink control channel. The first coverage enhancement mode may be requested during initial access in RACH using dedicated RACH resources. The first coverage enhancement mode may be requested in a scheduling request or capability report transmitted after a connection has been established with the wireless communication network. The first coverage enhancement mode may be requested after an indication is received in a bitmap field of MIB or SIB, or a combination of MIB and SIB that the first coverage enhancement mode is supported by a base station in the wireless communication network.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-15 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 4, 6 and 8 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. A method for wireless communication at a network entity in a wireless communication network, the method comprising:
    maintaining a plurality of configuration parameters associated with two or more coverage enhancement modes defined for one or more types of user equipment (UE) in a wireless communication network;
    selecting a first coverage enhancement mode from the two or more coverage enhancement modes for a first type of UE to accommodate at least one of one or more carrier frequencies, time or frequency duplexing mode, a cell size, capabilities of the first type of UE, or a channel measurements report associated with the first type of UE, wherein the first coverage enhancement mode is associated with a first set of configuration parameters, of the plurality of configuration parameters, that is associated with a set of control and data channels; and
    scheduling the set of control and data channels for communicating with the first type of UE using a first transmission scheme defined by the first set of configuration parameters associated with the first coverage enhancement mode, wherein the set of control and data channels includes uplink control and data channels and downlink control and data channels.

2. The method of claim 1, wherein the first coverage enhancement mode is selected to accommodate a restricted configuration of carrier aggregation, dual connectivity, dynamic spectrum sharing, and licensed-assisted access, configured for the first type of UE.

3. The method of claim 1, further comprising:
    configuring numbers of payload repetitions for communicating control and data information with the first type of UE on downlink or uplink, wherein the numbers of payload repetitions for control and data channel communication on downlink and uplink are jointly defined by the first set of the configuration parameters.

4. The method of claim 3, wherein the first transmission scheme defines one or more lower-order modulations when repetitions or frequency hopping is enabled for an uplink channel or for a downlink channel.

5. The method of claim 1, wherein the first set of the configuration parameters define a maximum number of frequency hops.

6. The method of claim 1, wherein the first set of the configuration parameters define a first range of coding rates for an uplink channel or for a downlink channel.

7. The method of claim 6, further comprising:
    configuring a number of payload repetitions or a number of frequency hops for communicating with the first type of UE on an uplink channel or for a downlink channel when a coding rate of a control or data channel lies within a configured range.

8. The method of claim 1, wherein the first transmission scheme defined by the first set of the configuration parameters is based on a lower modulation order including at least one of binary phase-shift keying (BPSK), quadrature phase-shift keying (QPSK), or 16-point quadrature amplitude modulation (16-QAM).

9. The method of claim 1, wherein the first set of the configuration parameters define an aggregation level for a physical downlink control channel (PDCCH), the method further comprising at least one of:
configuring a number of payload repetitions for communicating with the first type of UE when the aggregation level is greater than a threshold value including at least 8 or 16.

10. The method of claim 1, further comprising:
configuring an uplink or downlink reference signal to accommodate uplink or downlink coverage enhancement in accordance with the first set of the configuration parameters.

11. The method of claim 1, further comprising:
selecting a second coverage enhancement mode from the two or more coverage enhancement modes for communicating on uplink or downlink with a second type of UE, the second coverage enhancement mode being selected to accommodate corresponding one or more carrier frequencies, time or frequency duplexing mode, cell size, capabilities of the second type of UE, or a channel measurements report of the second type of UE; and
scheduling the first type of UE based on the first coverage enhancement mode and the second type of UE based on the second coverage enhancement mode, wherein the first type of UE and the second type of UE are different in term of at least one of a set of UE capabilities, mobility status, or processing timeline.

12. The method of claim 1, further comprising:
selecting a second coverage enhancement mode from the two or more coverage enhancement modes for communicating uplink or downlink control and data information with a second type of UE; and
scheduling a set of control and data channels for uplink or downlink communication with the second type of UE using a second transmission scheme that is different from the first transmission scheme.

13. The method of claim 12, wherein the first coverage enhancement mode is defined for a downlink broadcast data channel, control channel or reference signal and the second coverage enhancement mode is defined for a downlink unicast data channel, control channel or reference signal.

14. The method of claim 12, wherein the first coverage enhancement mode is defined for a single-hop communication link and the second coverage enhancement mode is defined for a multi-hop communication link.

15. The method of claim 12, wherein the first coverage enhancement mode defines a transport block size, downlink control information size or uplink control information size different from a corresponding transport block size, downlink control information size or uplink control information size defined by the second coverage enhancement mode.

16. The method of claim 1, further comprising:
indicating support for at least one coverage enhancement mode of the two or more coverage enhancement modes in a physical broadcast channel or a system information block.

17. The method of claim 16, further comprising:
indicating support for the at least one coverage enhancement mode in a master information block (MIB), a system information block (SIB), or a combination of the MIB and the SIB,
wherein the plurality of configuration parameters for uplink and downlink control, data, or reference signal communications corresponding to different coverage enhancement modes are specified in look-up tables that are hard-coded in accordance with a wireless standard.

18. The method of claim 16, further comprising:
dynamically configuring look-up tables that maintain the plurality of configuration parameters for uplink and downlink control, data, or reference signal communications corresponding to different coverage enhancement modes,
indicating support for the at least one coverage enhancement mode in at least one of a bitmap field of a master information block (MIB), a system information block (SIB), or a combination of the MIB and the SIB.

19. The method of claim 1, further comprising:
signaling a UE-specific coverage enhancement mode in dedicated radio resource control (RRC) signaling or in downlink control information (DCI), wherein the UE-specific coverage enhancement mode is selected from the two or more coverage enhancement modes.

20. The method of claim 19, wherein the UE-specific coverage enhancement mode is signaled in undefined bits of the DCI or by mapping to a demodulation reference signal or to cyclic redundancy check bits attached to the DCI.

21. The method of claim 1, wherein selecting the first coverage enhancement mode comprises:
receiving a request from the first type of UE for the first coverage enhancement mode, wherein the request for the first coverage enhancement mode is received during initial access in a random access channel (RACH) using dedicated RACH resources.

22. The method of claim 1, further comprising:
receiving a request from the first type of UE for the first coverage enhancement mode, wherein the request for the first coverage enhancement mode is received after a radio resource control (RRC) connection has been established with the wireless communication network, and wherein the first coverage enhancement mode is requested in an explicit scheduling request or a capability report provided by the first type of UE.

23. The method of claim 1, wherein each of the two or more coverage enhancement modes is configured with a distinct set of the plurality of configuration parameters to accommodate restricted configurations for modulation, coding rate, aggregation level, and repetition levels.

24. A network entity in a wireless communication network, comprising:
one or more memories; and
one or more processors coupled to the one or more memories, the one or more processors being configured to:
maintain a plurality of configuration parameters associated with two or more coverage enhancement modes defined for one or more types of user equipment (UE) in a wireless communication network;
select a first coverage enhancement mode from the two or more coverage enhancement modes for a first type of user equipment (UE) to accommodate at least one of one or more carrier frequencies, time or frequency duplexing mode, a cell size, capabilities of the first type of UE, or a channel measurements report associated with the first type of UE, wherein the first coverage enhancement mode is associated with a first set of configuration parameters, of the plurality of configuration parameters, that is associated with a set of control and data channels; and schedule the set of control and data channels for communicating with the first type of UE using a first transmission scheme defined by the first set of configuration parameters associated with the first coverage enhancement mode, wherein the set of control and data channels includes uplink control and data channels and downlink control and data channels.

25. The network entity of claim 24, wherein each of the two or more coverage enhancement modes is configured with a distinct set of the plurality of configuration parameters to accommodate restricted configurations for modulation, coding rate, aggregation level, and repetition levels.

26. A method for wireless communication at a user equipment (UE) in a wireless communication network, the method comprising:
maintaining a plurality of configuration parameters associated with two or more coverage enhancement modes defined for the wireless communication network;
configuring the UE for a first coverage enhancement mode selected from the two or more coverage enhancement modes to accommodate at least one of one or more carrier frequencies, time or frequency duplexing mode, a cell size, capabilities of the UE, or a channel measurements report associated with the UE, wherein the first coverage enhancement mode is associated with a first set of configuration parameters, of the plurality of configuration parameters, that is associated with a set of control and data channels; and
communicating over the set of control and data channels scheduled in accordance with the first coverage enhancement mode.

27. The method of claim 26, further comprising:
requesting the first coverage enhancement mode using an uplink control channel.

28. The method of claim 27, wherein the requesting the first coverage enhancement mode comprises:
requesting the first coverage enhancement mode during initial access in a random access channel (RACH) using dedicated RACH resources.

29. The method of claim 27, further comprising:
transmitting a scheduling request or a capability report after a radio resource control (RRC) connection has been established with the wireless communication network, wherein the first coverage enhancement mode is requested in an explicit scheduling request or the capability report.

30. The method of claim 27, further comprising:
receiving an indication in a master information block (MIB), a system information block (SIB), or a combination of the MIB and the SIB that the first coverage enhancement mode is supported by a network entity in the wireless communication network; and
requesting the first coverage enhancement mode after receiving the indication.

31. The method of claim 26, further comprising:
activating the first coverage enhancement mode in response to signaling received in downlink control information.

32. The method of claim 26, wherein each of the two or more coverage enhancement modes is configured with a distinct set of the plurality of configuration parameters to accommodate restricted configurations for modulation, coding rate, aggregation level, and repetition levels.

33. A user equipment (UE), comprising:
one or more memories; and
one or more processors coupled to the one or more memories, the one or more processors being configured to:
maintain a plurality of configuration parameters associated with two or more coverage enhancement modes for a wireless communication network;
configure the UE for a first coverage enhancement mode selected from the two or more coverage enhancement modes to accommodate at least one of one or more carrier frequencies, time or frequency duplexing mode, a cell size, capabilities of the UE, or a channel measurements report associated with the UE, wherein the first coverage enhancement mode is associated with a first set of configuration parameters, of the plurality of configuration parameters, that is associated with a set of control and data channels; and
communicate over the set of control and data channels scheduled in accordance with the first coverage enhancement mode.

34. The UE of claim 33, wherein each of the two or more coverage enhancement modes is configured with a distinct set of the plurality of configuration parameters to accommodate restricted configurations for modulation, coding rate, aggregation level, and repetition levels.

* * * * *